UNITED STATES PATENT OFFICE.

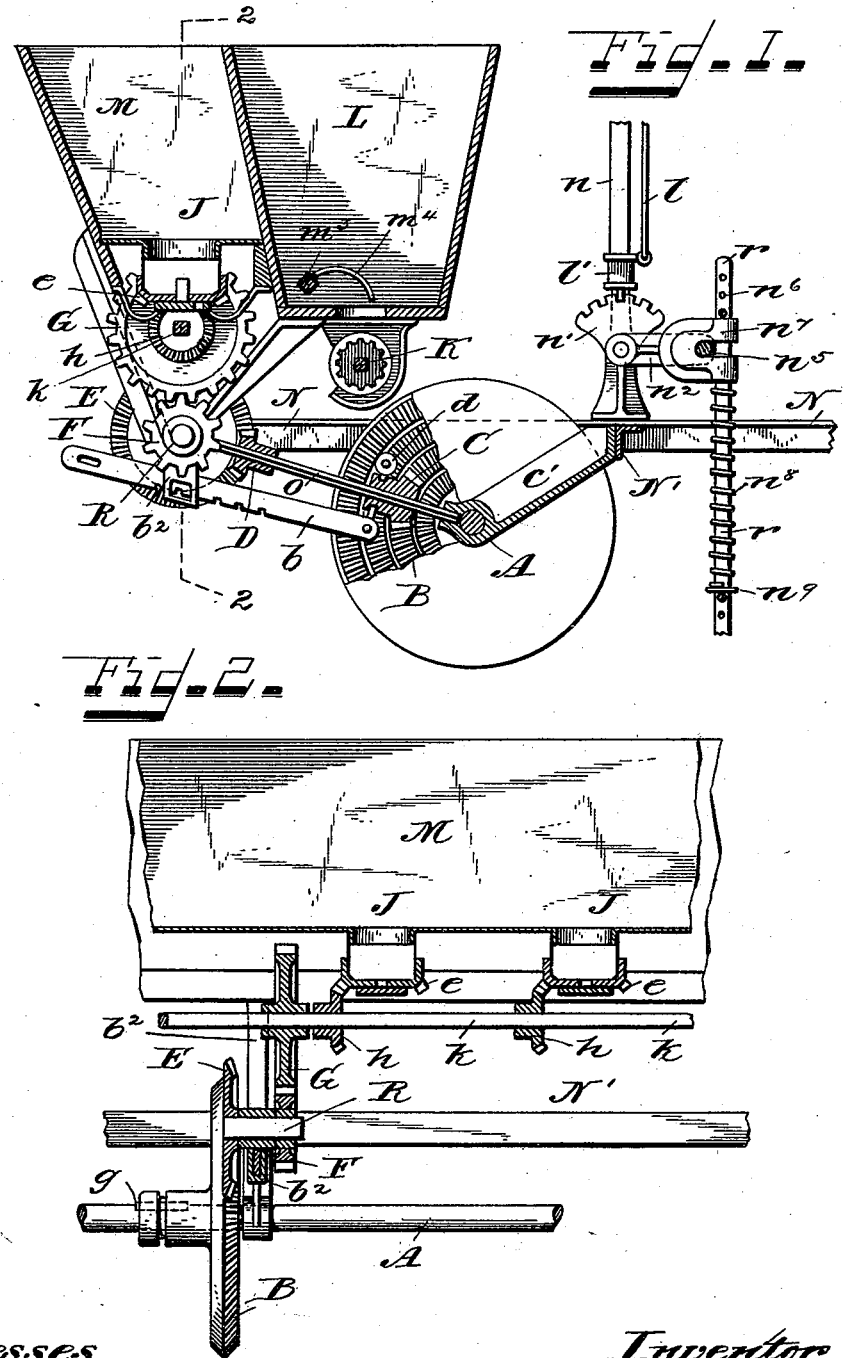

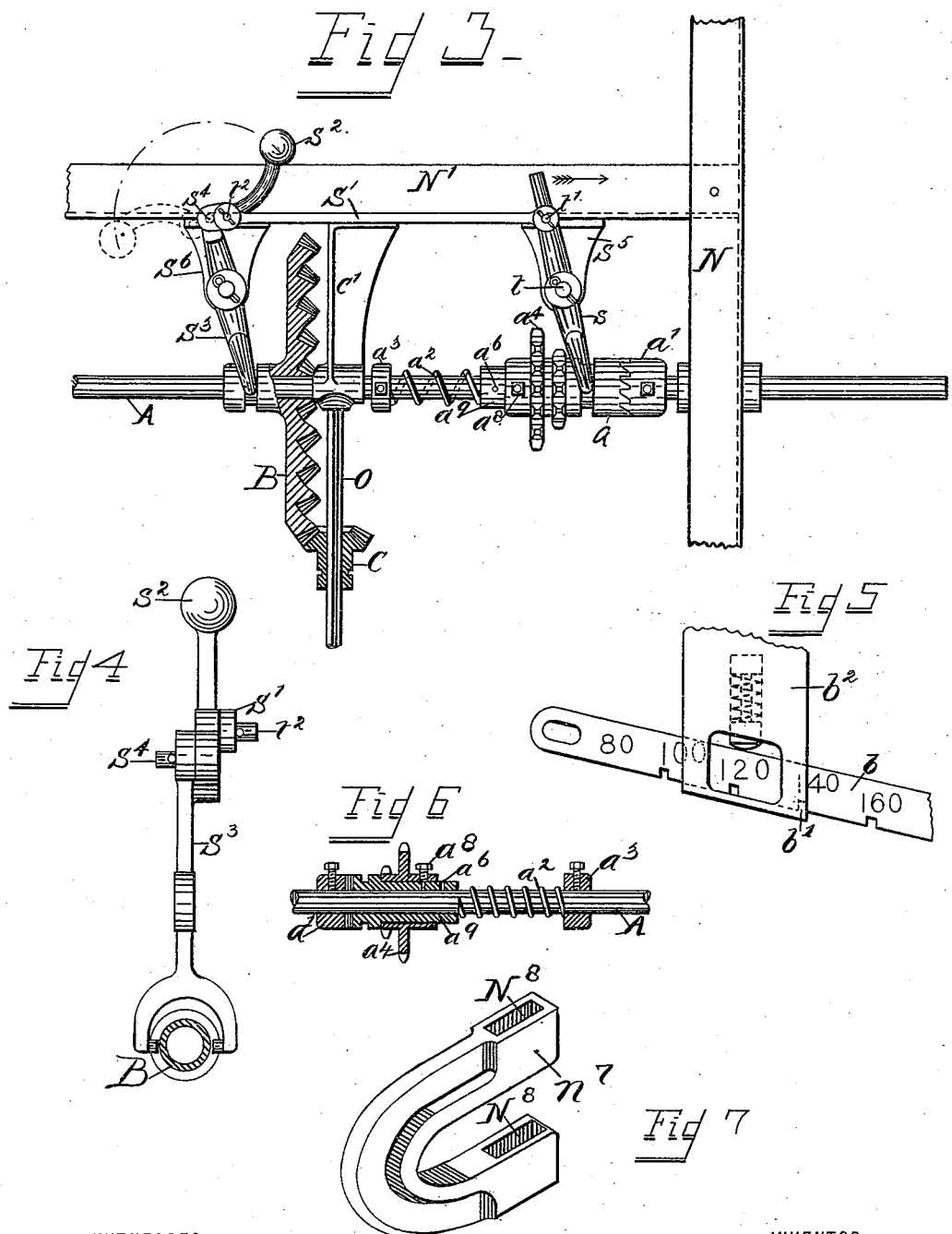

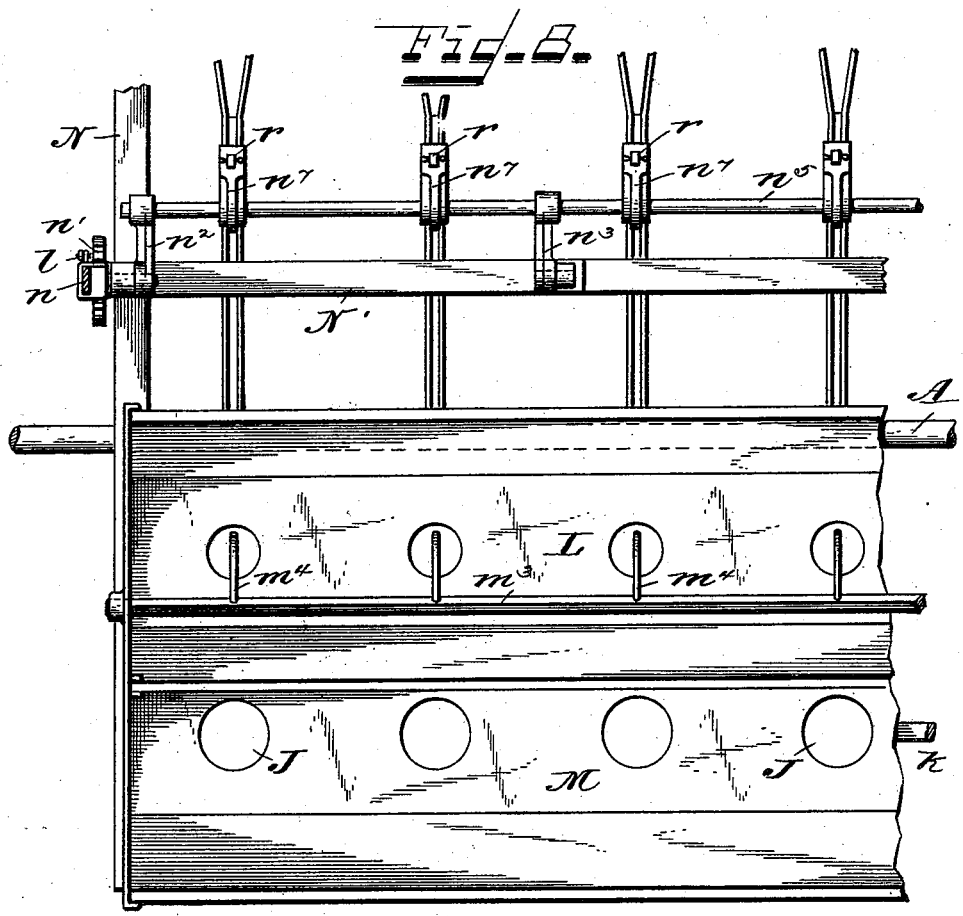

WILLIAM J. DEALTRY, OF LOUISVILLE, KENTUCKY, ASSIGNOR TO THE BRENNAN & COMPANY SOUTHWESTERN AGRICULTURAL WORKS, OF SAME PLACE.

SEEDING-MACHINE.

SPECIFICATION forming part of Letters Patent No. 553,705, dated January 28, 1896.

Application filed July 30, 1895. Serial No. 557,589. (No model.)

*To all whom it may concern:*

Be it known that I, WILLIAM J. DEALTRY, a citizen of the United States, residing at Louisville, in the county of Jefferson and State of Kentucky, have invented certain new and useful Improvements in Seeding-Machines, of which the following is a full, clear, and exact description, reference being had to the accompanying drawings, forming part of this specification.

My invention relates to improvements in seeding-machines, more particularly to hoe-drills and those in which fertilizer attachments are employed, although a number of the features of my invention can be used on the various other kinds of grain-drills.

One object of the invention is to provide a novel construction and arrangement for connecting the drag-bars of the drill with the lifting mechanism, whereby the connecting-rods for the drag-bars may serve as a lock for the sleeves coupling same to the lifting-bar.

Another object is to so connect the driving mechanism for the grain-feed with the driving mechanism of the fertilizer-feed that the one may be readily and easily disconnected from the other and that the grain may be fed without operating the fertilizer attachment. In addition to this there are certain other novel and useful features of my invention which will be hereinafter more particularly pointed out and claimed.

In the drawings, Figure 1 is a side elevation, partly in cross-section, of the grain and fertilizer hoppers and the driving mechanism therefor. Fig. 2 is a longitudinal section taken on the lines 2 2 of Fig. 1. Fig. 3 is a plan view of the shifting devices for throwing the fertilizer-feed gearing into and out of gear. Fig. 4 is a detail view of one portion of same. Fig. 5 is a side view in detail of the fertilizer-indicator. Fig. 6 is a longitudinal section of the sprocket-wheels and sleeves on the main axle. Fig. 7 is a perspective view of the lifting and pressure sleeve coupling the lifting-bar with the connecting-rods of the drag-bars. Fig. 8 is a top plan view of the seed and fertilizer hoppers and drag-bars of the machine. Fig. 9 is an end view of the seed-hopper, showing the mechanism for operating the stirrer-prongs.

The operating parts of the machine are mounted on a framework consisting of side bars N N and cross-bars N', carried on the main axle A of the machine, which is driven and supported by the usual ground-wheels.

L is the grain-hopper, and M the fertilizer-hopper.

Mounted on the axle A is a gear-disk B provided on one face with a series of concentric rows of teeth. Meshing with this disk B is the beveled pinion C, mounted on the rod O and adjustable along the same by means of the collar $d$, which is attached to and controlled by the notched gage-rod $b$.

$b^2$ is a hanger, through a slotted opening in which the bar or gage-rod $b$ passes.

$b'$ is a small rib extending across the bottom of the opening, which engages with the notches in the gage-rod, while a spring-plunger in a recess in the hanger $b^2$ keeps the notches in the gage-rod in firm contact with the rib, as shown in Fig. 5. The hanger $b^2$ is cut away, as shown in this figure, to leave an opening, through which may be seen the number indicating the quantity of the fertilizer to be fed. At the other end of the rod O is secured the beveled pinion D, meshing with the gear E, mounted on the stub-shaft R, supported on the hanger $b^2$, which stub-shaft carries at its other end the gear F, meshing with the gear G on the fertilizer-feed shaft $k$, upon which are mounted at suitable intervals any suitable feed mechanism $h$ $e$ for feeding the fertilizer.

K is the feed-shaft for the grain-feeding devices and is driven by sprocket and chain in connection with the sprocket-wheel $a^4$ mounted on the sleeve $a^9$ on the main axle A of the machine. Instead of a single sprocket-wheel I prefer to use a series of two or more sprocket-wheels, which are preferably cast in one piece and held in the desired position on the sleeve $a^9$ by a set-screw $a^8$ entering holes $a^6$ in the sleeve $a^9$. This sleeve $a^9$ is provided with a grooved collar and clutch held in engagement with the clutch-sleeve $a'$ on the main axle by the coiled spring $a^2$, the pressure being adjusted by the collar $a^3$.

S is the shifting-lever pivoted at $t$ to the bracket $S^5$, this lever being provided with a fork engaging in the groove in the sprocket-wheel sleeve $a$, so that when the lever is shifted in the direction of the arrow, Fig. 3, the grain-feed will be disconnected from the driving-axle. $S^3$ is a similar shifting-lever pivoted to a bracket $S^6$, the lower end of which engages with a groove in the hub of the disk-gear B.

$S^2$ is a handle or crank-arm pivoted to the outer end of the lever $S^3$ at $S^4$, and $S'$ is a connecting-rod pivoted to the lever S at $t'$ and to the handle-bar $S^2$ at $t^2$.

When the handle-bar $S^2$ is in the position to the right, as shown in Fig. 3, the grain-feed driving-wheel $a$ and the fertilizer-feed driving-disk B will be connected, so that the shifting of the lever S in the direction of the arrow will disconnect simultaneously the sprocket-wheel $a$ from its clutch $a'$, and the disk-gear B from the beveled pinion C. When, however, it is desired not to use the fertilizer-feed, the handle-bar $S^2$ is shifted to the left into the position shown in dotted lines in Fig. 3. This movement practically shortens the rod $S'$ twice the distance between $S^4$ and $t^2$, and the lever S being held stationary by the clutch-collar $a'$ the shortening of the rod $S'$ shifts the lever $S^3$ to the right, which forces disk-gear B out of connection with the beveled gear C, thus disconnecting the fertilizer-feed mechanism, so that by merely shifting the hand-crank $S^2$ the fertilizer-feed can be forced into and out of engagement without affecting the grain-feed.

Mounted on the end of the grain-feed shaft K is the sprocket-wheel $K'$, by means of which the agitator in the seed-hopper Y for small seed is driven. On this sprocket-wheel is cast the stud $K^2$, to which is pivoted the connecting-bar or pitman $m$ held on the stud by a spring-cotter.

$m^3$ is a shaft extending lengthwise through the seed-hopper L and journaled at each end of the hopper, upon which shaft are secured in any suitable manner the curved arms or prongs $m^4$, which are so placed on the shaft $m^3$ as to extend over each feed-opening in the hopper-bottom. $m'$ is an arm secured to this shaft $m^3$, pivoted at its outer end to the pitman $m$, so that with the rotation of the feed-shaft K the shaft $m^3$ will be given a reciprocating motion which will cause the prongs $m^4$ to ascend and descend over and into the feed-openings in the hopper-bottom, thus stirring the grain and preventing it from banking or arching over the feed-openings which certain kinds of grain, such as bearded oats or barley, have a tendency to do. These prongs also assist in the feeding of the grain by forcing the grain out of the feed-cups.

Extending across the rear of the machine from side to side is the lifting-bar $n^5$, which is secured to arms $n^2 n^3$ pivoted to the frame of the machine. The arm $n^2$ has secured to it in the usual way the lever $n$, so that by operating the lever the bar $n^5$ will be raised or lowered. This lever is located in any desired position by the dog $l'$ controlled by the rod $l$ and the usual thumb-latch, which dog takes into the notches in the arch $n'$ secured to the outer edge of the frame.

Upon the lifting-bar $n^5$ are placed the horseshoe-shaped sleeves $n^7$, one for each hoe of the machine, and slots $N^8$ in the ends of these sleeves receive the connecting-rods $r$ which are coupled, one to each drag-bar of the machine. Holes $n^6$ are provided in the upper ends of these connecting-rods through which spring-cotters are passed to hold the connecting-rods from dropping out and permit of their adjustment. The coiled spring $n^8$ supported by the washer $n^9$ and acting between this washer and the sleeves $n^7$ gives the usual spring-pressure to the drag-bars and hoes. With this arrangement of coupling the drag-bars to the lifting-bar it will be seen that the sleeves can be adjusted in place over the lifting-bar without removing the bar and that the connecting-rods passing through the openings in the ends of the sleeves lock the sleeve on the lifting-bar while the sleeves hold up and support the connecting-rods.

Having thus described my invention, what I claim, and desire to secure by Letters Patent, is—

1. In a grain-drill, the combination, with the lifting-bar for the hoes, of coupling sleeves open at one side mounted on said lifting bar, connecting rods, locking said sleeves on said bar and hoes to which said rods are connected, substantially as shown and described.

2. In a grain-drill, the combination, with the lifting-bar for the hoes, of clevis-shaped coupling-sleeves mounted on said lifting-bar, connecting rods passing through the ends of said clevis sleeves, to lock same to the lifting-bar, and hoes to which said connecting-rods are secured, substantially as shown and described.

3. In a grain-drill, the combination, with the lifting-bar for the hoes, of clevis-shaped coupling-sleeves mounted on said lifting-bar, connecting-rods passing through the ends of said sleeves and vertically adjustable therein, drag-bars, to which said connecting rods are secured, with springs acting between said bars and sleeves to exert pressure on the drag-bars, substantially as shown and described.

4. In a grain-drill, the combination, with two or more hoppers, and feeding devices therefor, of separate driving-gear for said feeding devices, shifting-levers for throwing said gearing into and out of operation, crank-arm pivoted to one of said levers, and connecting-rod joining the other lever and said crank-arm, whereby the shifting of said crank-arm shortens or lengthens the distance between the ends of said shifting levers, substantially as and for the purpose described.

WILLIAM J. DEALTRY.

Witnesses:
WM. O. MARSTRAND,
L. W. HOUINE.